Oct. 26, 1971          S. W. TRESOUTHICK                3,615,080
        APPARATUS FOR AND METHOD OF MANUFACTURING WHITE
                      PORTLAND CEMENT CLINKER
Filed Dec. 18, 1969                              3 Sheets-Sheet 1
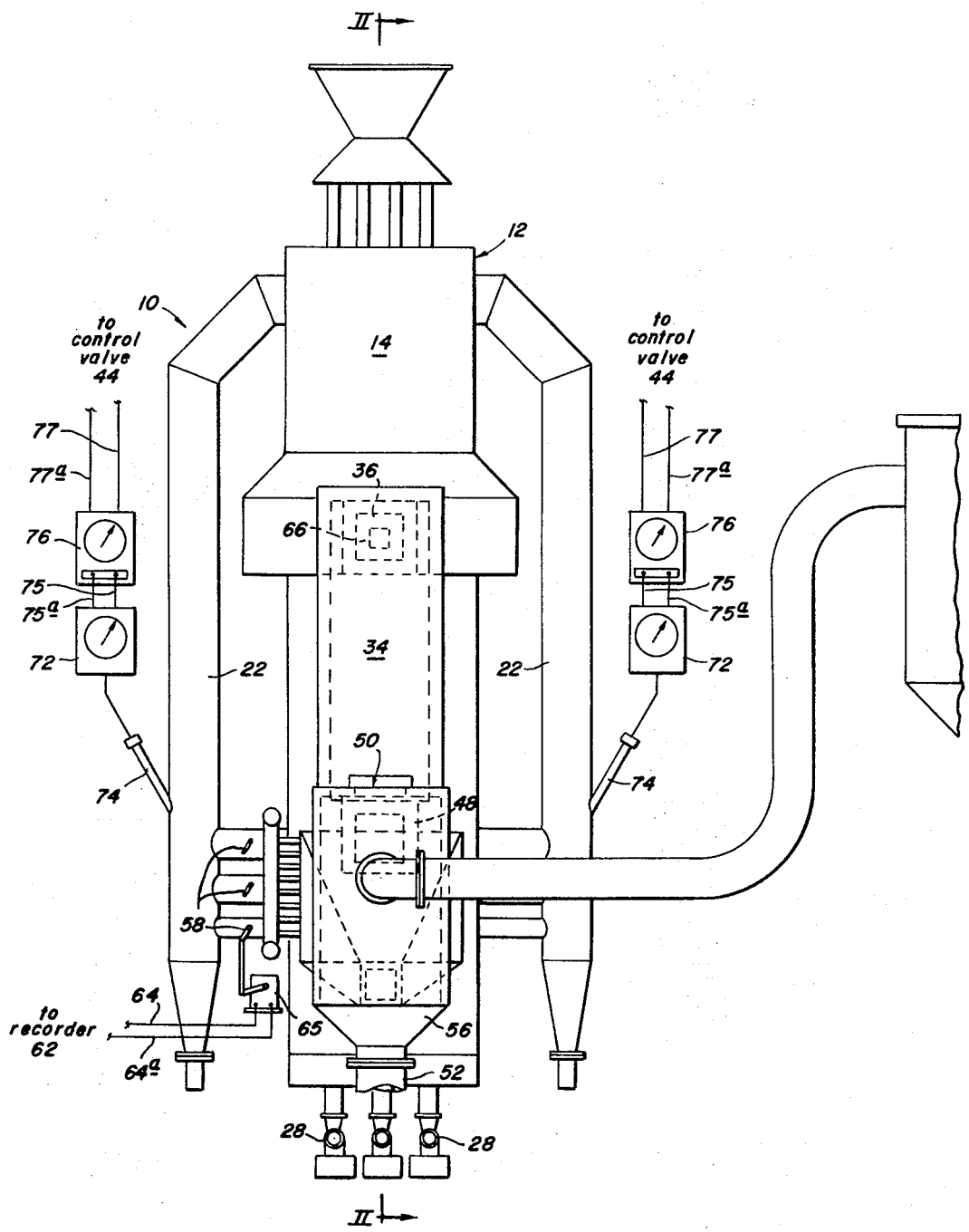
INVENTOR
STEWART W. TRESOUTHICK
By
his Attorney

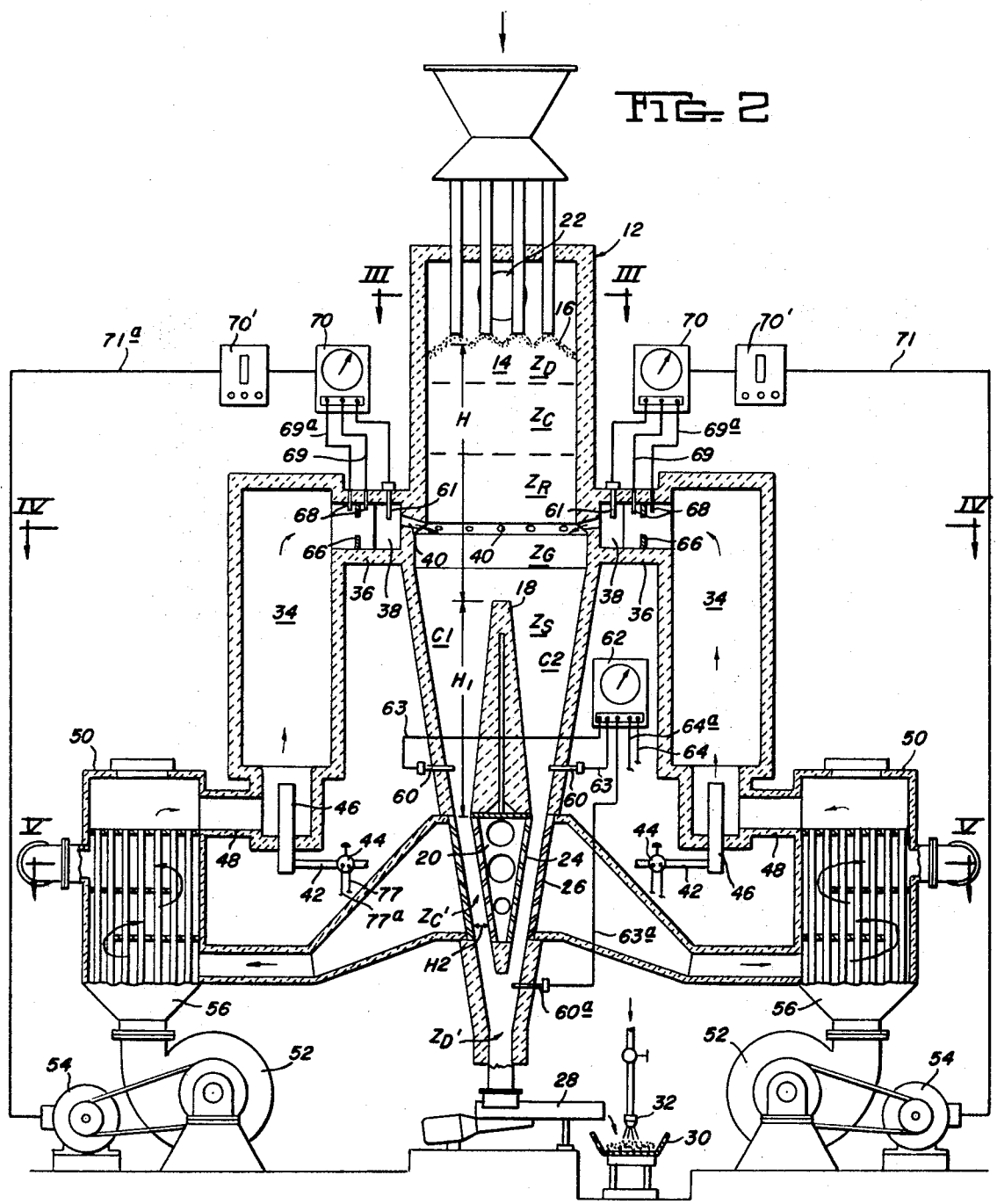

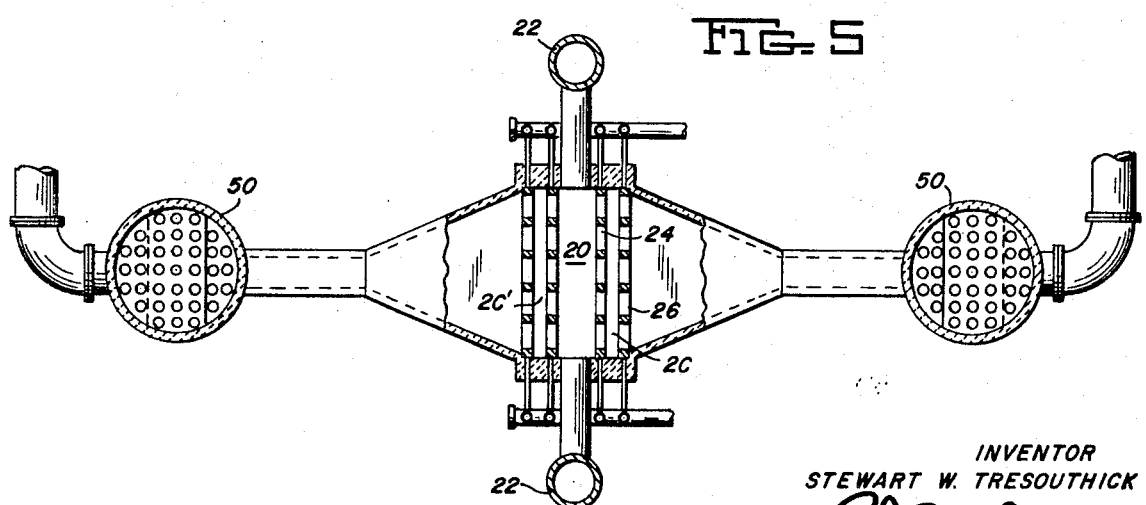

ated Oct. 26, 1971

United States Patent Office 3,615,080
Patented Oct. 26, 1971

3,615,080
APPARATUS FOR AND METHOD OF MANUFACTURING WHITE PORTLAND CEMENT CLINKER
Stewart W. Tresouthick, McCandless Township, Allegheny County, Pa., assignor to United States Steel Corporation
Filed Dec. 18, 1969, Ser. No. 886,232
Int. Cl. F27b 1/00
U.S. Cl. 263—29                                           38 Claims

ABSTRACT OF THE DISCLOSURE

An apparatus for and method of manufacturing white portland cement clinker are disclosed. The apparatus has a reactor provided with a reactor bed adapted to receive and process white portland cement clinker raw material. The reactor has a heating and drying zone for removing the water from the raw material; a calcining adjacent the heating and drying zone for calcining the calcareous portion of raw material; a reaction zone adjacent the calcining zone for clinkering the raw material; a gas distribution zone adjacent the reaction zone for receiving a heating and reducing fluid having a pressure sufficient to traverse the reaction zone, the calcining zone and the heating and drying zone with a residual remaining pressure; and a gas seal zone adjacent the gas distribution zone. A divider in the gas seal zone split the flow of the sintered raw material into two channels. Each channel has a constricted passage in the direction of the flow of the sintered raw material to produce a pressure drop through the gas seal zone greater than the pressure in the heating and reducing fluid. A cooling zone of the reactor adjacent the gas sealing zone cools the sintered raw material. A cooling plenum in the cooling zone is connected to the heating and drying zone and has a first louver which defines with an exit louver the cooling zone, thus retaining the sintered raw material in the cooling zone while emitting the heating and reducing fluid from such cooling zone. A discharge means in a discharge zone of the reactor discharges the sintered material while sealing the discharge zone from the atmosphere.

The method includes the steps of:

(a) receiving the raw material in the reactor bed of the reactor;
(b) passing the raw material through a heating and drying zone to remove the water from the raw material;
(c) passing the dried raw material through a calcining zone adjacent the heating and drying zone to calcine the calcareous portion of the raw material;
(d) passing the reacted raw material through a gas distribution zone adjacent the reaction zone to receive a heating and reducing fluid produced from a fluid fuel burned in a deficiency of oxygen-bearing gas and having a pressure sufficient to traverse the reaction zone, the calcining zone and the heating and drying zone with a residual remaining pressure;
(e) passing the raw material through a gas sealing zone adjacent the gas distribution zone;
(f) splitting the flow of the sintered raw material in the gas seal zone into two channels, each channel having a constricted passage in the direction of the flow of the raw material to produce a pressure drop through such gas seal zone greater than the original pressure in such heating and reducing fluid;
(g) passing the sintered raw material through a cooling zone adjacent the gas seal zone to cool the sintered raw material under reducing conditions;
(h) receiving the heating and reducing fluid at the residual remaining pressure in a cooling plenum in the cooling zone;
(i) retaining the raw material in the cooling zone while emitting the heating and reducing fluid from the cooling plenum into the cooling zone;
(j) retaining the raw material in the cooling zone while emitting the heating and reducing fluid from the cooling zone through an exit louver;
(k) passing the sintered raw material through a discharge zone adjacent the cooling zone; and
(l) discharging the raw material while sealing the discharge zone from the atmosphere.

BACKGROUND OF THE INVENTION

Heretofore, white cement clinker has been made in rotary kilns or on traveling pellet grates and has been made according to two basic principles or methods. The first principle or method has been the use of a neutral medium such as water to rapidly quench the hot clinker so as to "fix" the iron compounds in a fairly colorless state and to freeze the liquid portion of the clinker thus producing as high as percentage of "glass" as possible. The second principle or method is that of producing and cooling the clinker in a reducing atmosphere, holding the clinker in that atmosphere until the clinker temperature is below approximately 1000° F. The action of the reducing atmosphere changes the valence state of the iron compounds so that the iron compounds are rendered essentially colorless.

The manufacture of white portland cement clinker, regardless of the method used starts with the selection of calcareous and argillaceous raw materials that are relatively free of metallic elements such as Fe, Cr, Mn, and other colorants. A typical example of the constituents of a white cement clinker raw material is:

|  | Percent |
|---|---|
| $SiO_2$ | 15.5 |
| $Al_2O_3$ | 2.3 |
| $Fe_2O_3$ | .24 |
| $CaO$ | 44.8 |
| Loss | 36.0 |

The raw material is ground to a pulverulent state either in a wet or dry condition, is chemically corrected and blended for precise oxide balance and is then subjected to pyroprocessing typical or gray portland cement clinker burning technology. However, as shown above, instead of the usual air cooling typically used in gray portland cement clinker pyroprocessing, methods of water quenching, steam quenching, chemical reduction, and combinations of both are used to treat the clinker as a final step to pyroprocessing.

It has been shown that the most efficient method of whitening such clinker is to contact the clinker with a reducing gas and, at the same time, cool the clinker from about 2300° F. within a time period of about 10 minutes to 60 minutes depending on the chemistry of the clinker. Other methods of treating clinker such as water quenching and the like are not able to produce very white cement (reflectivity of ±90%) particularly if the raw materials contain over .30% $Fe_2O_3$ equivalent. Methods have been proposed to carry out the process of reduction and simultaneous cooling (i.e., U.S. Pat. 3,425,853, issued to John Joseph Rives and assigned to Cement La Farge, Paris, France) but such methods require considerable maintenance and a high fuel usage since most of the sensible heat in the clinker after discharge from the kiln is absorbed by cooling water and is lost.

OBJECTS OF THE INVENTION

It is the general object of this invention to avoid and overcome the foregoing and other difficulties of and objections to prior art practices by the provision of an improved apparatus for and method of making white portland cement clinker, which apparatus and method:

(1) utilize an external heat source rather than conventional mixing of fuel with the feed pellets or burning the fuel in situ inside the pellet bed or the rotary kiln;

(2) sinter white portland cement type raw material at relatively low temperature but over a relatively long time interval thereby:

(a) providing relatively low fuel consumption;
(b) minimizing the liquification of certain of the clinker compounds that would tend to cause agglomeration of the pellets in the shaft; and
(c) eliminating conventional de-agglomerating mechanisms;

(3) produce the sinter under chemically reducing conditions, and further thermally process such sinter under neutral or reducing conditions in the complete absence of oxygen, thus changing the state of the metallic oxide colorants to render them essentially colorless;

(4) cool white portland cement sinter under reducing conditions through and below a critical temperature of about 1000° F. below which the iron or other metallic oxides are not affected by the presence of oxygen thereby allowing the metallic oxides to remain in their essentially colorless state; and (5) control the flow of gases within a packed bed of pellets so that two different directions of gas flow may be carried out in the same bed without mechanical gas locks.

BRIEF SUMMARY OF THE INVENTION

The aforesaid objects of this invention and other objects which will become apparent as the description proceeds are achieved by providing an improved method of and apparatus for manufacturing white portland cement clinker. The apparatus has a reactor provided with a reactor bed adapted to receive and process white portland cement clinker raw material. The reactor has a heating and drying zone for removing the water from the raw material; a calcining zone adjacent the heating and drying zone for calcining the calcareous portion of the raw material; a calcining zone adjacent the heating and drying zone for calcining the calcareous portion of the raw material; a reaction zone adjacent the calcining zone for clinkering the raw material; a gas distribution zone adjacent the reaction zone for receiving a heating and reducing fluid having a pressure sufficient to traverse the reaction zone, the calcining zone and the heating and drying zone with a residual remaining pressure; and a gas seal zone adjacent the gas distribution zone. A divider in the gas seal zone splits the flow of a sintered raw material into two channels. Each channel has a constricted passage in the direction of the flow of the raw material to produce a pressure drop through the gas seal zone greater than the pressure in the heating and reducing fluid. A cooling zone of the reactor adjacent the gas sealing zone cools the sintered raw material. A cooling plenum in the cooling zone is connected to the heating and drying zone and has a first louver which defines with an exit louver the cooling zone, thus retaining the sintered raw material in the cooling zone while emitting the heating and reducing fluid from such cooling zone. A discharge means in a discharge zone of the reactor discharges the sintered material while sealing the discharge zone from the atmosphere.

The method includes the steps of:

(a) receiving the raw material in the reactor bed of the reactor;
(b) passing the raw material through a heating and drying zone to remove the water from the raw material;
(c) passing the dried raw material through a calcining zone adjacent the heating and drying zone to calcine the calcareous portion of the raw material;
(d) passing the reacted raw material through a gas distribution zone adjacent the reaction zone to receive a heating and reducing fluid produced from a fluid fuel burned in a deficiency of oxygen-bearing gas and having a pressure sufficient to traverse the reaction zone, the calcining zone and the heating and drying zone with a residual remaining pressure;
(e) passing the raw material through a gas sealing zone adjacent the gas distribution zone;
(f) splitting the flow of the sintered raw material in the gas seal zone into two channels, each channel having a constricted passage in the direction of the flow of the raw material to produce a pressure drop through such gas seal zone greater than the original pressure in such heating and reducing fluid;
(g) passing the sintered raw material through a cooling zone adjacent the gas seal zone to cool the sintered raw material under reducing conditions;
(h) receiving the heating and reducing fluid at the residual remaining pressure in a cooling plenum in the cooling zone;
(i) retaining the raw material in the cooling zone while emitting the heating and reducing fluid from the cooling plenum into the cooling zone;
(j) retaining the raw material in the cooling zone while emitting the heating and reducing fluid from the cooling zone through an exit louver;
(k) passing the sintered raw material through a discharge zone adjacent the cooling zone; and
(l) discharging the sintered material while sealing the discharge zone from the atmosphere.

BRIEF DESCRIPTION OF THE SEVERAL VIEWS OF THE DRAWINGS

For a better understanding of this invention reference should be had to the accompanying drawings, wherein like numerals of reference indicate similar parts throughout the several views and wherein:

FIG. 1 is a vertical elevational view of the vertical reactor and a portion of the dust collector;

FIG. 2 is a vertical sectional view along the line 2—2 of FIG. 1 in the direction of the arrows;

FIG. 3 is a horizontal sectional view along the line 3—3 of FIG. 2 in the direction of the arrows and showing the feed section of the reactor;

FIG. 4 is a horizontal sectional view along the line 4—4 of FIG. 1 in the direction of the arrows and showing the tuyere section of the reactor; and FIG. 5 is another horizontal sectional view along the line 5—5 of FIG. 1 showing the fluid or water section of the reactor.

Although the principles of this invention are broadly applicable to the manufacturing of white portland cement clinkers, this invention is particularly adapted for use in conjunction with a vertical reactor for the manufacture of such white portland cement clinker and hence it has been so illustrated and will be so described.

DETAILED DESCRIPTION

With specific reference to the form of this invention illustrated in the drawings and referring particularly to FIGS. 1 and 2, an apparatus for manufacturing white portland cement clinker is indicated generally by the reference numeral 10.

This apparatus 10 has a reactor 12 (FIGS. 1, 2) provided with a reactor bed 14 (FIGS. 1, 2) adapted to receive and process white portland cement clinker raw material 16 (FIG. 2) in pellet form. The reactor bed 14 has a heating and drying zone $Z_D$ (FIG. 2) for removing the water from the raw material 16. Such heating and drying zone $Z_D$ retains the raw materals 16 for about 20 to about 80 minutes at a temperature of about 500 to about 700° F. Adjacent the heating and drying zone $Z_D$ a calcining zone $Z_C$ (FIG. 2) calcines the calcareous portion of the raw material 16, retaining such raw material 16 therein for about 30 to about 90 minutes at a temperature of about 1600° to about 1750° F. A reaction zone $Z_R$ (FIG. 2) adjacent the calcining zone $Z_C$ clinkers the raw material 16 during a retention time of about 20 to about 120 minutes at a temperature of about 2600° to about 2650° F. As a result, a substantial amount of liquid phase in the raw material 16 is eliminated. The raw material 16 is essentially free flowing. Conventional (de-agglomerating) devices are not required and the colorant elements of the raw material 16 are changed to a relatively colorless state.

A gas distribution zone $Z_G$ (FIG. 2) adjacent the reaction zone $Z_R$ receives a heating and reducing fluid indicated by the arrows (in FIG. 2) which fluid is produced from a fluid fuel (such as powdered coal, oil, gas or the like) burned in a deficiency of oxygen-bearing gas such as air, oxygen, or the like. The heating and reducing fluid contains CO, $H_2$ and combinations thereof in the amount of about 2–4% by volume as measured adjacent the heating and drying zone $Z_D$ by gas analyzers 72 (FIG. 1). The heating and reducing fluid has a temperature of about 2600° to about 2750° F., and a pressure of about 3½ to about 4½ pounds per square inch, which pressure is required for the fluid to traverse the reaction zone $Z_R$, the calcining $Z_G$ and the heating and drying zone $Z_C$ (a distance of H, FIG. 2) with a residual remaining pressure of about ½ pound per square inch for a future work purpose as hereinafter explained. The raw material 16 is resident in the gas distribution zone $Z_G$ for about 15 to about 45 minutes.

A gas seal zone $Z_S$ (FIG. 2), adjacent the gas distribution zone $Z_G$, retains the raw material 16 therein for about 15 to about 45 minutes at a temperature of about 2300° to to about 2500° F. A divider 18 (having a height $H_1$, FIG. 2) is disposed in the gas seal zone $Z_S$ for the purpose of splitting the flow of the sintered raw material 16 into two channels C1, C2. Each channel C1, C2, shown in FIG. 2, has a constricted passage in the direction of the flow of the raw material 16 to produce a pressure drop through the gas seal zone $Z_S$ greater than the original pressure produced in the heating and reducing fluid thereby preventing the passage of the heating and reducing fluid through the gas seal zone $Z_S$.

Cooling zone $Z_C'$, FIG. 2 (having a width H2, FIG. 2) is adjacent the gas seal zone $Z_S$, cools the sintered raw material from a temperature of about 2300° F. to a temperature of about 1000° F. under reducing conditions and utilizes a retention time of about 10 to about 30 minutes. A cooling plenum 20 (FIG. 2, 5) is disposed in the cooling zone $Z_C'$ and is connected to the heating and drying zone $Z_D$ by downcomers 22 (FIGS. 1–5). The downcomers 22 receive the heating and reducing fluid at the residual remaining pressure of about ½ pound per square inch and at a temperature of about 250° to about 350° F. The cooling plenum 20 has a first or entrance louver 24 (FIG. 2) which retains the raw material 16 in the cooling zone $Z_C'$ while emitting the heating and reducing fluid from the cooling plenum 20 into the cooling zone $Z_C'$. The residual remaining pressure of about ½ pound per square inch is insufficient to traverse the gas seal zone $Z_S$. For the purpose of defining the cooling zone $Z_C'$ with the first louver 24, an exit louver 26 (FIG. 2) is employed. Such exit louver 26 retains the raw material 16 in the cooling zone $Z_C'$ while emitting the cooling and reducing fluid from the cooling zone $Z_C'$ at a temperature of about 825° F.

A discharge zone $Z_D'$ (FIG. 2) adjacent the cooling zone $Z_C'$ retains the sintered raw material 16 therein for about 3 to about 6 minutes at a temperature of about 800 to about 1000° F. Discharge means, such as the controlled feeders 28 (FIGS. 1, 2) of the tubular electro-magnetic type manufactured by Syntron Co., Homer City, Pa. disposed in the discharge end of the discharge zone $Z_D'$ for discharging the raw material 16 onto a conveyor 30 (FIG. 2). The control feeders 28 also seal the discharge zone $Z_D'$ from the atmosphere. For the purpose of cooling the sintered raw material or clinker 16, a spray 32 disposed above the conveyor 30 (FIG. 2) sprays such clinker 16 with a fluid, such as cooling water or the like.

COMBUSTOR

For the purpose of burning a fluid fuel, such as powdered coal, oil or the like, in a deficiency of an oxygen-bearing gas such as air, oxygen, or the like, combustor means such as the combustors 34 (FIGS. 1, 2, 4) of the type manufactured by Surface Combustion Div., Toledo, Ohio is employed. The combustors 34 are connected to the reactor 12 adjacent the gas distribution zone $Z_G$ by a hot gas conduit 36, a hot gas manifold 38, and tuyeres 40. The fluid fuel is fed by fuel lines 42 (FIG. 2) through control valves 44 to burners 46 disposed in the bottom of the combustors 34 adjacent inlets 48 to the combustor 34 from the top of preheaters 50 (FIGS. 1, 2, 5).

PREHEATER 50

Each preheater 50 receives cooled heating and reducing fluid from the cooling zone $Z_C'$ as hereinafter explained and preheats the combustion fluid, such as an oxygen bearing gas (for example, air, oxygen, or the like) to a temperature of about 400° to about 500° F. Blower means, such as the blowers 52 (FIG. 2), driven by variable speed motors 54 are connected to inlets 56 of the preheaters 50 and force the combustion fluid through the preheaters 50, the combustors 34 and the reactor 12.

CONTROL MEANS

For the purpose of maintaining a predetermined temperature differential across the cooling zone $Z_C'$, a first connecting means, such as the downcomers 22 (FIGS. 1–5) connect the heating and drying zone $Z_D$ to the cooling plenum 20. Damper means, such as vernier dampers 58 (FIG. 1) or the like, are disposed in the downcomers 22 for controlling the flow of the heating and reducing fluid into the cooling plenum 20. Temperature measuring means, such as the two thermocouples 60 and 60a (FIG. 2), are connected to the reactor 12 above and below the cooling zone $Z_C'$, as shown in FIG. 2, for measuring respectively the entrance temperature and the exit temperature of the heating and reducing fluid to and from respectively the cooling zone $Z_C'$. The thermocouples 60 and 60a are connected to a differential temperature recorder controller 62 by lines 63, 63a. Such recorder controller 62 is of the type Speedomax H manufactured by Leeds and Northrup, Philadelphia, Pa. In turn, lines 64 and 64a connect the recorder controller 62 to an actuator 65 (FIG. 1) of the type RC manufactured by Bailey Meter Company, Cleveland, Ohio. The actuator 65 operates the lower damper 58 to vary the distribution of the cooled heating and reducing fluid through the cooling zone $Z_C'$ thereby maintaining a predetermined temperature differential across the cooling zone $Z_C'$.

In order to provide a uniform flow of heating and reducing fluid at the predetermined pressure of about 3½ to about 4½ pounds per square inch mentioned above, gas flow orifices 66 (FIG. 2) are disposed in the hot gas conduits 36. Differential pressure measuring means, such as taps 68 (FIG. 2), are disposed on either side of the gas flow orifices 66 and are connected by lines 69–69a to a mass flow integrator 70. Temperature measuring means, such as thermocouple 61 (FIG. 2) also is connected to the mass flow integrator 70 which is composed of a multiplier-divider such as Model 564, and a Model 565 square root extractor both made by General Electric Co., Schenectady, N.Y. The integrator is connected to a controller 70' such as a GEMAC 540–01 made by General Electric Co., Schenectady, N.Y. Lines 71–71a connect the controller 70' to the variable speed motor drive 54 to vary the speed of the blower 52 to provide the reactor 12 with the desired uniform mass flow of heating and reducing fluid at the predetermined desired rate of about 350 to about 500 pounds of fluid per minute, the higher or lower rate depending on the size of the reactor 12 and the throughput.

For the purpose of maintaining a predetermined reducing content of about 2 to 4% by volume of CO, $H_2$ and combinations thereof as measured adjacent the heating and drying zone $Z_D$ (FIG. 2), the downcomers 22 are utilized to connect the heating and drying zone $Z_D$ to the cooling plenum 20 and a gas analyzer means, such as the gas analyzers 72 (FIG. 1) of the type OC1530A manufactured by Bailey Meter Co., Cleveland, Ohio, have probes 74 (FIG. 1) inserted in the downcomers 22 for analyzing the reducing content of the heating and reducing fluid. The gas analyzers 72 are each connected by lines 75 and 75a to a controller 76 of the type GEMAC 540-01 manufactured by General Electric Co., Schenectady, N.Y., which controller 76 is connected by lines 77–77a to the control valves 44 (FIG. 2) on the fuel line 42. The control fuel valves 44 are operable by the gas analyzers 72 to maintain a predetermined reducing content, as mentioned above, in the heating and reducing fluid.

ALTERNATIVE EMBODIMENTS

It will be understood by those skilled in the art that alternatively the heating and drying zone $Z_D$ and the calcining zone $Z_C$ may be removed from the reactor 12 and their operations performed in a separable kiln (not shown). Although not shown in FIGS. 1 and 2, in this case the downcomers 22 may be water cooled to reduce the temperature of the heating and reducing fluid to the desired cooling temperature of about 250° to about 350° F. for entrance into the cooling plenum 20.

In addition, the gas flow orifice 66 may be inserted in the inlet 48 to the preheater 50.

The probes 74 on the gas analyzer 72 may be inserted or positioned in either the heating and drying zone $Z_D$ (FIG. 2) or in the cooling plenum 20.

SUMMARY OF THE ACHIEVEMENT OF THE OBJECTS OF THE INVENTION

It will be recognized by those skilled in the art that the objects of this invention have been achieved by providing an improved apparatus 10 for and method of making white portland cement clinker 16, which apparatus and method utilize an external heat source rather than conventional mixing of fuel with the feed pellets 16 or burning the fuel in situ inside the pellet bed 14; sinter white portland cement type raw material 16 at relatively low temperature but over a relatively long time interval thereby providing relatively low fuel consumption, minimizing the liquification of certain of the clinker compounds 16 that would tend to cause agglomeration of the pellets 16 in the reactor 12, and eliminating conventional de-agglomerating mechanisms; produce the sinter 16 under chemically reducing conditions and further thermally process such sinter 16 under neutral or reducing conditions in the complete absence of oxygen, thus changing the state of the metallic oxide colorants to render them essentially colorless; cool white portland cement sinter 16 under reducing conditions through and below a critical temperature of about 1000° F. below which the iron or other metallic oxides are not affected by the presence of oxygen thereby allowing the metallic oxides to remain in their essentially colorless state; and control the flow of gases within a packed bed 14 of pellets 16 so that two different directions of gas flow may be carried out in the same bed 14 without mechanical gas locks.

While in accordance with the patent statutes a preferred and alternative embodiments of this invention have been illustrated and described in detail, it is to be particularly understood that the invention is not limited thereto or thereby.

I claim:

1. Apparatus for manufacturing white portland cement clinkers; said apparatus having:

(a) a reactor provided with a reactor bed adapted to receive and process white portland cement clinker raw material,
(b) said reactor bed having:
(1) a heating and drying zone for removing the water from said raw material,
(2) a calcining zone adjacent said heating and drying zone for calcining the calcareous portion of said raw material,
(3) a reaction zone adjacent said calcining zone for clinkering said raw material, substantially lessening liquid phases in said raw material, causing said raw material to be substantially free flowing, eliminating de-agglomerating devices, and changing the colorant elements of raw material to a relatively colorless state,
(4) a gas distribution zone adjaecnt said reaction zone for receiving a heating and reducing fluid produced from a fluid fuel burned in a deficiency of an oxygen bearing gas, said heating and reducing fluid containing CO, $H_2$ and combinations thereof and having a pressure sufficient to traverse said reaction zone, said calcining zone, and said heating and drying zone with a residual remaining pressure,
(5) a gas seal zone adjacent said gas distribution zone,
(6) a divider in said gas seal zone having a constricted passage in the direction of said flow of said raw material to produce a pressure drop through said gas seal zone greater than said pressure, thereby preventing the passage of said heating and reducing fluid through said gas seal zone,
(7) a cooling zone adjacent said gas seal zone, for cooling said sintered raw material under reducing conditions,
(8) a cooling plenum in said cooling zone connected to said heating and drying zone for receiving said heating and reducing fluid at said residual remaining pressure, said cooling plenum having a first louver for retaining said raw material in said cooling zone while emitting said heating and reducing fluid from said cooler plenum into said cooling zone, said residual remaining pressure being said residual remaining insufficient to traverse said gas seal zone,
(9) an exit louver defining said cooling zone with said first louver, said exit louver retaining said sintered raw material in said cooling zone while emitting said heating and reducing fluid from said cooling zone, and
(10) a discharge zone adjacent said cooling zone,
(11) dischrage means in said discharge zones for discharging said raw material and for sealing said discharge zone from the atmosphere.

2. The apparatus recited in claim 1 and having combustor means connected to said reactor adjacent said gas distribution zone for producing said heating and reducing fluid.

3. The apparatus recited in claim 2 and having preheater means connected to said exit louver for receiving said cooled heating and reducing fluid and for preheating combustion fluid, said preheater means being connected to said combustor means to feed said preheated combustion fluid to said combustor means.

4. The apparatus recited in claim 1 wherein said heating and drying zone has a retention time of about 20 to 80 minutes at a temperature of about 500–700° F.

5. The apparatus recited in claim 1 wherein said calcining zone has a retention time of about 30 to 90 minutes at a temperature of about 1600–1750° F.

6. The apparatus recited in claim 1 wherein said reaction zone has a retention time of about 20 to 120 minutes at a temperature of about 2600° F. to 2650° F.

7. The apparatus recited in claim 1 wherein said heating and reducing fluid containing CO, $H_2$ and combinations thereof in the amount of about 2 to 4% by volume as mesured adjacent said heating and drying zone, having a temperature of about 2600 to 2750° F., and a pressure of about 3½ to 4½ pounds/square inch.

8. The apparatus recited in claim 1 wherein said gas distribution zone has a retention time of about 15 to 45 minutes.

9. The apparatus recited in claim 1 wherein said gas seal zone has a retention time of about 15 to 45 minutes at a temperature of about 2300 to 2500° F.

10. The apparatus recited in claim 1 wherein said cooling zone cools said sintered raw material from about 2300° F. to about 1000° F.

11. The apparatus recited in claim 1 wherein said cooling zone has a retention time of about 10 to 30 minutes.

12. The apparatus recited in claim 1 wherein said heating and reducing fluid entering said cooling plenum is at a temperature of about 250° to 350° F.

13. The apparatus recited in claim 1 wherein said exit louver emits said heating and reducing fluid from said cooling zone at a temperature of about 825° F.

14. The apparatus recited in claim 1 wherein said discharge zone has a retention time of about 3 to 6 minutes at a temperature of about 800 to 1000° F.

15. The apparatus recited in claim 3 wherein said preheater means preheats said combustion fluid to a temperature of about 400 to 500° F.

16. The apparatus recited in claim 1 and having a first connecting means between said heating and drying zone and said cooling plenum, damper means in said first connecting means for controlling the flow of said heating and reducing fluid into said cooling plenum and temperature measuring means connected to said reactor for measuring the entrance temperature and exit temperature of said heating and reducing fluid to and from respectively said cooling zone and connected to said damper means, said damper means being operable by said temperature measuring means to vary the distribution of said cooled heating and reducing fluid through said cooling zone to maintain a predetermined temperature differential across said cooling zone.

17. The apparatus recited in claim 1 and having blower means connected to said combustor means for moving said heating and reducing fluid through said reactor.

18. The apparatus recited in claim 17 and having a second connecting means between said combustor means and said gas distribution zone, a gas flow orifice in said second connecting means, pressure measuring means adjacent said orifice for measuring the pressure differential through said orifice, and connected to said blower means, said pressure differential means being operable to vary the speed of said blower means to provide said reactor with a uniform flow of heating and reducing fluid at said pressure.

19. The apparatus recited in claim 1 and having a first connecting means between said heating and drying zone and said cooling plenum, gas analyzer means in said first connecting means for analyzing the reducing content of said heating and reducing fluid, fuel supply means connected to said combustor means, valve means in said fuel supply means, connected to said gas analyzer means and operable by said gas analyzer means to maintain a predetermined reducing content in said heating and reducing fluid.

20. A method of manufacturing white portland cement clinkers; said method including the steps of:
(a) receiving white portland cement clinker raw material in a reactor bed of a reactor,
(b) passing said raw material through a heating and drying zone of said reactor bed for removing the water from said raw material,
(c) passing said dried raw material through a calcining zone adjacent said heating and drying zone for calcining the calcareous portion of said raw material,
(d) passing said calcined raw material through a reaction zone adjacent said calcining zone for clinkering said raw material, thereby substantially lessening liquid phases in said raw material, causing said raw material to be substantially free flowing, eliminating de-agglomerating devices, and changing the colorant elements of raw material to a relatively colorless state,
(e) passing said reacted raw material through a gas distribution zone adjacent said reaction zone for receiving a heating and reducing fluid produced from a fluid fuel burned in a deficiency of an oxygen bearing gas and having a pressure sufficient to traverse said reaction zone, said calcining zone, and said heating and drying zone with a residual remaining pressure.
(f) passing said raw material through a gas seal zone adjacent said gas distribution zone,
(g) constricting the flow of said sintered raw material in said gas seal zone in the direction of said flow of said raw material to produce a pressure drop through said gas seal zone greater than said pressure, thereby preventing the passage of said heating and reducing fluid through said gas seal zone,
(h) passing said sintered raw material through a cooling zone adjacent said gas seal zone for cooling said sintered raw material under reducing conditions,
(i) receiving said heating and reducing fluid at said residual remaining pressure in a cooling plenum in said cooling zone,
(j) retaining said raw material in said cooling zone while emitting said heating and reducing fluid from said cooling plenum into said cooling zone, said residual remaining pressure being said residual remaining insufficient to traverse said gas seal zone,
(k) retaining said raw material in said cooling zone while emitting said heating and reducing fluid from said cooling zone through an exit louver,
(l) passing said sintered raw material through a discharge zone adjacent said cooling zone, and
(m) discharging said raw material while sealing said discharge zone from the atmosphere.

21. The method recited in claim 20 including the step of producing said heating and reducing fluid in a combustor means connected to said reactor adjacent said gas distribution zone.

22. The method recited in claim 21 and including the step of receiving said cooled heating and reducing fluid in a preheater means connected to said exit louver, preheating combustion fluid, and feeding said preheated combustion fluid to said combustor means.

23. The method recited in claim 20 including the step of retaining said raw material in said heating and drying zone for about 20 to 80 minutes at a temperature of about 500–700° F.

24. The method recited in claim 20 including the step of retaining said raw material in said calcining zone for about 30 to 90 minutes at a temperature of about 1600–1750° F.

25. The method recited in claim 20 including the step of retaining said raw material in said calcining zone for about 20 to 120 minutes at a temperature of about 2600° F. to 2650° F.

26. The method recited in claim 20 including the step of producing said heating and reducing fluid to contain CO, $H_2$ and combinations thereof in the amount of about 2 to 4% by volume as measured adjacent said heating and drying zone, to have a temperature of about 2600 to 2750° F., and to have a pressure of about 3½ to 4½ pounds/square inch.

27. The method recited in claim 20 including the step of retaining said raw material in said gas distribution zone for about 15 to 45 minutes.

28. The method recited in claim 20 including the step of retaining said raw material in said gas seal zone for about 15 to 45 minutes at a temperature of about 2300 to 2500° F.

29. The method recited in claim 20 including the step of cooling said raw material in said cooling zone from about 2300° F. to about 1000° F.

30. The method recited in claim 20 including the step of cooling said sintered raw material in said cooling zone for about 10 to 30 minutes.

31. The method recited in claim 20 including the step of introducing said heating and reducing fluid into said cooling plenum at a temperature of about 250° to 350° F.

32. The method recited in claim 20 including the step of exiting said heating and reducing fluid from said cooling zone at a temperature of about 825° F.

33. The method recited in claim 20 including the step of retaining said calcined raw material in said discharge zone for about 3 to 6 minutes at a temperature of about 800 to 1000° F.

34. The method recited in claim 22 including the step of preheating said combustion fluid to a temperature of about 400 to 500° F.

35. The method recited in claim 20 and including the steps of:
(a) connecting said heating and drying zone and said cooling plenum,
(b) controlling the flow of said heating and reducing fluid into said cooling plenum,
(c) measuring the entrance temperature and exit temperature of said heating and reducing fluid to and from respectively said cooling zone, and
(d) varying the distribution of said cooled heating and reducing fluid through said cooling zone to maintain a predetermined temperature differential across said cooling zone.

36. The method recited in claim 20 including the step of moving said heating and reducing fluid through said reactor.

37. The method recited in claim 36 and including the steps of:
(a) connecting said combustor means and said gas distribution zone,
(b) measuring the pressure differential through an orifice in the flow of heating and reducing means, and
(c) varying said flow to provide said reactor with a uniform flow of heating and reducing fluid at said pressure.

38. The method recited in claim 20 including the steps of:
(a) connecting said heating and drying zone and said cooling plenum,
(b) analyzing the reducing content of said heating and reducing fluid, and
(c) maintaining a predetermined reducing content in said heating and reducing fluid.

References Cited

UNITED STATES PATENTS

| | | | |
|---|---|---|---|
| 3,033,545 | 5/1962 | Azbe | 263—29 |
| 3,159,209 | 12/1964 | Dailey, Jr. | 263—29 |
| 3,429,462 | 2/1969 | Frederiksen et al. | 263—29 X |

JOHN J. CAMBY, Primary Examiner

U.S. Cl. X.R.

263—53 R

UNITED STATES PATENT OFFICE
CERTIFICATE OF CORRECTION

Patent No. __3,615,080__   Dated __October 26, 1971__

Inventor(s) __Stewart W. Tresouthick__

It is certified that error appears in the above-identified patent and that said Letters Patent are hereby corrected as shown below:

Column 1, line 18, after "calcining" insert -- zone -- ; line 27, "split" should read -- splits -- . Column 2, line 22, "as", second occurrence, should read -- a -- ; line 45, "or" should read -- of -- . Column 5, line 24, "$Z_C$" should read -- $Z_G$ -- , and "$Z_C$" should read -- $Z_D$ -- ; line 48, "FIG." should read -- FIGS. -- . Column 8, line 54, "dischrage" should read -- discharge -- . Column 9, line 4, "mesured" should read -- measured -- .

Signed and sealed this 31st day of October 1972.

(SEAL)
Attest:

EDWARD M. FLETCHER, JR.
Attesting Officer

ROBERT GOTTSCHALK
Commissioner of Patents